US012801570B2

(12) United States Patent
Hong et al.

(10) Patent No.: US 12,801,570 B2
(45) **Date of Patent: *Nov. 17, 2026**

(54) SYSTEMS AND METHODS CONCERNING TRACKING MODELS FOR DIGITAL INTERACTIONS

(71) Applicant: The grät Network, PBC, Newport Beach, CA (US)

(72) Inventors: Andy Soung-uk Hong, Newport Beach, CA (US); Jonathan W. Pullen, Seattle, WA (US); Steve Mason, Las Vegas, NV (US)

(73) Assignee: The grät Network, PBC, Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/886,831

(22) Filed: Sep. 16, 2024

(65) Prior Publication Data

US 2025/0013607 A1 Jan. 9, 2025

Related U.S. Application Data

(63) Continuation of application No. 17/129,245, filed on Dec. 21, 2020, now Pat. No. 12,124,410, which is a continuation of application No. 15/399,327, filed on Jan. 5, 2017, now Pat. No. 10,901,945.

(60) Provisional application No. 62/275,160, filed on Jan. 5, 2016.

(51) Int. Cl.
*G06F 16/16* (2019.01)

(52) U.S. Cl.
CPC ............ *G06F 16/16* (2019.01); *G06F 16/164* (2019.01)

(58) Field of Classification Search
CPC ............................... G06F 16/16; G06F 16/164
See application file for complete search history.

(56) References Cited

U.S. PATENT DOCUMENTS

| | | | |
|---|---|---|---|
| 5,219,184 | A | 6/1993 | Wolf |
| 7,590,603 | B2 | 9/2009 | Zhang et al. |
| 7,610,255 | B2 | 10/2009 | Willcock |
| 7,711,578 | B2 | 5/2010 | Williams et al. |

(Continued)

FOREIGN PATENT DOCUMENTS

| | | |
|---|---|---|
| WO | 2014151999 | 9/2014 |

OTHER PUBLICATIONS

"GitHub jannahastings/emotion-ontology: Automatically exported from code.google.com/p/emotionontology", https://github.com/jannahastings/emotion-ontology/, Screenshot Captured on Jun. 3, 2017. Date Unknown. 2 Pages.

(Continued)

*Primary Examiner* — Miranda Le
(74) *Attorney, Agent, or Firm* — STETINA GARRED BRUCKER & NEWBOLES

(57) ABSTRACT

An emotion tracking computer system is presented. An emotion tracking server obtains digital content representing an assertion of the existence of an emotional relationship among multiple entities; e.g., an assertion of gratitude. The server creates one or more instances of emotion objects that model the assertion of the emotional relationship, where such objects are stored in an emotion database. The emotion objects form data primitives that provide opportunities for analyzing contexts of relationships. Gratitude tracking is discussed with some specificity.

19 Claims, 4 Drawing Sheets

(56) References Cited

U.S. PATENT DOCUMENTS

| | | | |
|---|---|---|---|
| 7,711,667 B2 | 5/2010 | Baumard | |
| 7,953,607 B2 | 5/2011 | McNairy | |
| 8,250,096 B2 | 8/2012 | Su et al. | |
| 8,489,527 B2 | 7/2013 | van Coppenolle et al. | |
| 8,504,423 B2 | 8/2013 | Rotbard et al. | |
| 8,504,550 B2 | 8/2013 | Hall et al. | |
| 8,719,255 B1 * | 5/2014 | Pope | G06F 16/9538 707/723 |
| 8,903,751 B1 | 12/2014 | Yarbrough et al. | |
| 8,930,480 B2 * | 1/2015 | Appelman | H04L 67/10 709/227 |
| 9,026,476 B2 | 5/2015 | Bist | |
| 9,055,433 B2 | 6/2015 | Maguire | |
| 9,143,907 B1 | 9/2015 | Caldwell et al. | |
| 9,199,122 B2 | 12/2015 | Kaleal, III et al. | |
| 9,294,583 B1 | 3/2016 | Sherrets et al. | |
| 9,298,806 B1 * | 3/2016 | Vessenes | G06F 16/244 |
| 9,430,439 B2 | 8/2016 | Morris | |
| 9,613,033 B2 | 4/2017 | Oskooi et al. | |
| 9,686,308 B1 * | 6/2017 | Srivastava | H04L 51/212 |
| 9,756,487 B1 | 9/2017 | Ghadialy | |
| 9,762,719 B2 | 9/2017 | Tartz et al. | |
| 10,402,792 B2 | 9/2019 | Lin et al. | |
| 2006/0020632 A1 | 1/2006 | Choi et al. | |
| 2006/0042483 A1 | 3/2006 | Work et al. | |
| 2007/0078664 A1 | 4/2007 | Grace | |
| 2007/0137073 A1 | 6/2007 | Vinocur | |
| 2007/0150281 A1 | 6/2007 | Hoff | |
| 2008/0103907 A1 | 5/2008 | Maislos et al. | |
| 2008/0181399 A1 | 7/2008 | Weise et al. | |
| 2008/0215424 A1 | 9/2008 | Guldimann et al. | |
| 2009/0216524 A1 | 8/2009 | Skubacz et al. | |
| 2009/0217178 A1 * | 8/2009 | Niyogi | G06F 16/24578 707/999.1 |
| 2010/0092932 A1 | 4/2010 | Castineiras | |
| 2010/0115419 A1 | 5/2010 | Mizuno | |
| 2010/0145719 A1 | 6/2010 | Williams et al. | |
| 2010/0250682 A1 * | 9/2010 | Goldberg | H04L 51/234 709/206 |
| 2010/0262454 A1 | 10/2010 | Sommer et al. | |
| 2010/0262597 A1 | 10/2010 | Han | |
| 2010/0268580 A1 | 10/2010 | Vermes | |
| 2010/0318555 A1 | 12/2010 | Broder et al. | |
| 2011/0218846 A1 * | 9/2011 | Fieldman | G06Q 30/0211 705/14.16 |
| 2012/0035943 A1 | 2/2012 | Araghi et al. | |
| 2012/0158455 A1 * | 6/2012 | Pathak | G06Q 50/01 705/7.29 |
| 2012/0203707 A1 | 8/2012 | Hungerford et al. | |
| 2012/0254312 A1 | 10/2012 | Patel | |
| 2012/0290672 A1 * | 11/2012 | Robinson | H04L 67/104 709/206 |
| 2013/0097269 A1 | 4/2013 | Plotkin | |
| 2013/0254283 A1 | 9/2013 | Garcia-Martinez et al. | |
| 2014/0040406 A1 | 2/2014 | Ollila et al. | |
| 2014/0052489 A1 | 2/2014 | Prieto | |
| 2014/0089399 A1 | 3/2014 | Chun et al. | |
| 2014/0275740 A1 | 9/2014 | Crane | |
| 2014/0337450 A1 * | 11/2014 | Choudhary | H04L 51/52 709/206 |
| 2014/0351332 A1 | 11/2014 | Ben-Kiki et al. | |
| 2014/0379352 A1 | 12/2014 | Gondi et al. | |
| 2015/0019317 A1 * | 1/2015 | Mitchell | G06Q 30/0226 705/14.27 |
| 2015/0044654 A1 | 2/2015 | Lendvay et al. | |
| 2015/0081464 A1 * | 3/2015 | Ng | G06Q 20/384 705/26.1 |
| 2015/0088914 A1 * | 3/2015 | Zeng | H04L 12/1813 707/751 |
| 2015/0106225 A1 * | 4/2015 | Glass | G06Q 20/12 705/26.7 |
| 2015/0140527 A1 | 5/2015 | Gilad-Barach et al. | |
| 2015/0172236 A1 | 6/2015 | Meijer et al. | |
| 2015/0193718 A1 | 7/2015 | Shaburov et al. | |
| 2015/0193889 A1 | 7/2015 | Garg et al. | |
| 2015/0248476 A1 * | 9/2015 | Weissinger | G06F 16/35 707/737 |
| 2015/0248620 A1 | 9/2015 | Liden et al. | |
| 2015/0272982 A1 | 10/2015 | Hageman | |
| 2015/0278820 A1 | 10/2015 | Meadows | |
| 2015/0348123 A1 * | 12/2015 | Darwin | G06Q 30/0633 705/14.66 |
| 2015/0381533 A1 * | 12/2015 | Klemm | H04L 51/02 709/206 |
| 2016/0036739 A1 | 2/2016 | Glass et al. | |
| 2016/0055236 A1 | 2/2016 | Frank et al. | |
| 2016/0086500 A1 * | 3/2016 | Kaleal, III | A61B 5/20 434/257 |
| 2016/0210963 A1 * | 7/2016 | Kim | G10L 15/1822 |
| 2016/0260169 A1 * | 9/2016 | Arnold | G06Q 20/381 |
| 2017/0140049 A1 | 5/2017 | Chefalas et al. | |
| 2017/0147202 A1 | 5/2017 | Donohue | |

OTHER PUBLICATIONS

Uschold, Michael, "Is the Road to Euphoria Paved by Thanking with Reckless Abandon?" https://semanticarts.com/blog/ontology-of-gratitude/, Nov. 24, 2014. 7 Pages.

* cited by examiner

SYSTEMS AND METHODS CONCERNING TRACKING MODELS FOR DIGITAL INTERACTIONS

CROSS-REFERENCE TO RELATED APPLICATIONS

This application is a continuation of U.S. Non-Provisional application Ser. No. 17/129,245, filed Dec. 21, 2020, now U.S. Pat. No. 12,124,410, issued Oct. 22, 2024, which is a continuation of U.S. Non-Provisional application Ser. No. 15/399,327, filed Jan. 5, 2017, now U.S. Pat. No. 10,901, 945, issued Jan. 26, 2021, which claims the benefit of U.S. Provisional Application No. 62/275,160, filed Jan. 5, 2016, the contents of which are expressly incorporated herein by reference.

STATEMENT RE: FEDERALLY SPONSORED RESEARCH/DEVELOPMENT

Not Applicable

TECHNICAL FIELD

The present inventive subject matter relates to computer implemented technologies for extracting, categorizing, storing and/or managing digital models of emotion in digital interactions, especially gratitude.

BACKGROUND

The background description includes information that may be useful in understanding the present inventive subject matter. It is not an admission that any of the information provided herein is prior art or relevant to the presently claimed inventive subject matter, or that any publication expressly or implicitly referenced herein is prior art.

Numerous different emotions govern our daily lives. One under-recognized and under-appreciated human emotion is gratitude. Recent, growing evidence indicates that human lives are positively affected by expressions of gratitude. Consider the Greater Good Science Center at the University of California, Berkeley ("GGSC"; see URL greatergood-.berkeley.edu). GGSC has recognized that gratitude is more than a trivial emotion and that it represents an important aspect of the human experience. GGSC also offers access to numerous studies indicating the value of expressing gratitude. However, the value of gratitude remains significantly under-recognized to the larger community. In 2012, GGSC launched a web site (called "Thnx4.org") that provides a platform by which people can share their expressions of gratitude. The platform appears to permit individuals to submit "thanks" as content and journal feelings of gratitude. GGSC and its website do not appear to model gratitude in its complexity. Thus, Thanx4.org does not disclose a foundational firmament that models the emotional richness of gratitude.

Others have also put forth efforts to create a web-based platform through which individuals can express gratitude. For example, U.S. patent application publication 2012/0254312 to Patel, titled "Methods and Systems for Incentivizing, Exchanging, and Tracking Expressions of Gratitude within a Network," filed Mar. 29, 2012, seeks to create a web-based interface for expressing gratitude via a means called a "thankuconomy" and through which expressions of gratitude are incentivized via a reciprocal gift. The Patel approach does not disclose or emphasize that expressions of gratitude represent an intimate emotional relationship targeting the recipient rather than the initiator. Further, does not disclose how to create a model for gratitude or other types of emotion-based digital transactions.

From a digital modeling perspective, some minor effort has been directed to creating ontologies for emotion or even for mental functions. As an example, consider the efforts by the Swiss Centre for Affective Sciences and University of Buffalo as described by the project found on GitHub at URL github.com/jannahastings/emotion-ontology. The effort described therein does not provide any apparent reference to gratitude or insight into the nature of digital models of gratitude. In the blog post by Michael Uschold titled "Is the Road to Euphoria Paved by with Thanking Reckless Abandon?" (see URL semanticarts.com/blog/ontology-of-gratitude), Uschold describes a simple view of a small gratitude-based ontology. The Uschold gratitude ontology does not disclose how to implement or properly model myriad possible points of gratitude or the full spectrum that gratitude can take.

U.S. patent application publication 2010/0115419 to Mizuno titled "Gratitude Providing System and Gratitude Providing Method," filed Mar. 8, 2007, describes a computer system that allows users to present "chao," a visual value of information representing the feeling of appreciation, to another. While recognizing appreciation, Mizuno does not identify and model the full spectrum of expressions that gratitude can encompass.

The known efforts put forth, appear to be directed to informal efforts toward defining gratitude and do not bring forth sufficient insight into creating a full model of gratitude. This is further evidenced by the following references that merely make passing reference to gratitude, but do not describe how to create an intimate means of expressing the full spectrum of gratitude and, in particular, by using technological means:

- U.S. Pat. No. 5,219,184 to Wolf, titled "Gift Card Incorporating a Thank You Note and Method," filed Oct. 27, 1992;
- U.S. Pat. No. 8,489,527 to von Coppenolle et al., titled "Method and Apparatus for Neuropsychological Modeling of Human Experience and Purchasing Behavior," filed Oct. 21, 2011;
- U.S. Pat. No. 8,903,751 to Yarbrough et al., titled "Detecting Participant Helpfulness in Communications," filed Jan. 28, 2011;
- U.S. Pat. No. 9,199,122 to Kaleal et al., titled "Personalized Avatar Responsive to User Physical State and Context";
- U.S. patent application publication 2007/0078664 to Grace, titled "Method and Instrument for Expressing Gratitude for a Scholastic Experiences," filed May 19, 2003;
- U.S. patent application publication 2010/0268580 to Vermes, titled "Network-Based Simulated Package for Enclosing Digital Objects," filed Mar. 22, 2010;
- U.S. patent application publication 2014/0275740 to Crane, titled "System for Modifying a User's Neurological Structure or Neurochemistry by Improving Mood, Positivity Level, or Resilience Level, Incorporating a Social Networking Website and Method of Use Thereof" filed Mar. 14, 2014;
- U.S. patent application publication 2014/0379352 to Gondi et al., titled "Portable Assistive Device for Combating Autism Spectrum Disorder," filed Jun. 16, 2014;

U.S. patent application publication 2015/0044654 to Lendvay et al., titled "Crowed-Sourced Assessment of Technical Skill (C-SATS™/CSATS™)," filed Aug. 8, 2014;

U.S. patent application publication 2015/0140527 to Gilad-Barach et al., titled "Providing Interventions by Leveraging Popular Computer Resources," filed Nov. 19, 2013;

U.S. patent application publication 2015/0193718 to Shaburoz et al. "Emotion Recognition for Workforce Analytics" filed Mar. 23, 2015;

U.S. patent application publication 2015/02729832 to Hageman, titled "Product for Use in the Prophylactic or Therapeutic Treatment of a Negative Emotion or Introvert Behaviour," filed internationally on Jul. 5, 2013; and International patent application publication WO 2014/151999 to Liu-Qiu-Yan, titled "System and Method to Survey and Evaluative Items According to People's Perceptions and to Generate Recommendations Based on People's Perceptions" filed internationally on Mar. 13, 2014.

Interestingly, the above efforts fail to fully appreciate that gratitude, and other emotions as well, could have many shades or dimensions associated with it. By understanding, quantifying, and modeling these shades or dimensions as described in the Applicants' work below, gratitude can be made and/or harnessed into a driving force for positive social impact. Thus, there is a need for computer systems and methods by which models of emotions, especially models of assertions of gratitude, can be tracked, managed and analyzed.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients and/or properties such as concentration, reaction conditions, and so forth, and used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the statistical variance calculated from their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes a plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each possible individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY

The inventive subject matter provides apparatuses, systems and methods in which models of various emotions, especially gratitude, can be digitally discovered, recognized, recorded, stored, analyzed, or otherwise managed. One aspect of the inventive technology includes a computer-implemented emotion model tracking system that is able to manage digital emotion assets and, more specifically, gratitude-based assets. The tracking system includes at least a computer-based emotion database and an emotion tracking server. The emotion database comprises a computing device having a tangible, non-transitory computer readable memory (e.g., RAM, SSD, HDD, RAID, NAS, SAN, etc.) storing a number of indexed emotion objects. Of particular note, each emotion object digitally represents an emotional relationship between at least two entities. For example, a gratitude object can represent an assertion of gratitude from one person (e.g., a first entity) to another person (e.g., a second entity) for an act of kindness. The emotion objects can be instances of one or more defined emotion classes having numerous data members. More preferred data members of the emotion objects include an emotion object identifier (e.g., a GUID, UUID, name, hash value, etc.) that references the specific emotion object, an initiator identifier (e.g., GUID, name, email address, etc.) that identifies the entity that initiates an assertion of the emotional relationship, and a recipient identifier that identifies the entity that receives or is the target of the emotional relationship assertion. An especially interesting data member of the emotion object includes an emotion metric that represents a value (e.g., a number, scalar, vector, text, multi-valued data, etc.) associated with the asserted emotional relationship; e.g., a measure of gratitude granted to the recipient.

The emotion tracking server couples with the emotion database to manage the emotion objects. The emotion tracking server is a computing device having at least one processor and also having a tangible, non-transitory computer readable memory that stores software instructions. The software instructions, when executed by the processors of the server, cause the server to take one or more actions related to the emotion objects in the emotion database (e.g., create, move, copy, delete, link, monitor, log, alert, report, secure, etc.). Execution of the instructions causes the server to receive one or more pieces of digital content from other devices (e.g., mobile phones, tablets, web servers, sensors, etc.) where the digital content relates or otherwise represents an emotional relationship between an initiator entity and a recipient entity; e.g., an expression of gratitude in the form of a multi-model creative composition having images, audio, text, and video. The server, possibly based on the digital content, obtains a new emotion object identifier to identify the emotional relationship. The server further derives (e.g., generates, calculates, looks up, etc.) identifiers for the initiator entity and the recipient entity that define the emotional relationship from the digital content. Using the obtained or derived emotion object identifier and entity identifiers, the server instantiates a new emotion object according to the emotion class or classes where the new emotion object specifically models the assertion of the emotional relationship as represented by the digital content. The server provisions or assigns the emotion metric of the new emotion object with an instance emotion value that can also be derived from the digital content. As examples, the instance emotion value could be a unitary value (i.e., 1), a weighted value, a measured value, a vector, a multi-valued data structure, or other value that represents the effect or nature of the assertion. The server can further store the new emotion object in the emotion database, possibly by linking it with other associated emotion objects.

Another, more specific aspect of the inventive subject matter includes a computer-implemented gratitude model tracking system. The gratitude model tracking system is similar to the emotion tracking system described above and specifically manages gratitude objects. The gratitude tracking system includes a gratitude database that stores instances of gratitude objects that model assertions or expressions of gratitude. The system further includes a gratitude tracking server coupled with the gratitude database; said server creates instances of gratitude objects based on received digital content. The instantiated gratitude objects form a model of the expression of gratitude, including a gratitude value that can be combined with other gratitude metrics to form a gratitude index or trend. The instantiated gratitude objects are stored in the gratitude database, possibly linked with other gratitude objects.

The gratitude model tracking system and method of the inventive subject matter enables the tracking of a non-incremental range of expressions of gratitude or other emotion in a digital exchange, the categorization and storage of the same, previously unavailable in known systems. For example, in some social media settings, a user can either "like" or "dislike" a particular posting, thus providing a positive or negative as it relates to target posting. In other social media settings, for example, a user might be able to select from an incremental series of "likes", ranging from 0 to 5. In either case, in known systems any expressions toward a target posting or person, would be based on pre-set parameters, without being able to capture a rich range of expression that would more accurately model a particular human emotion such as gratitude.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
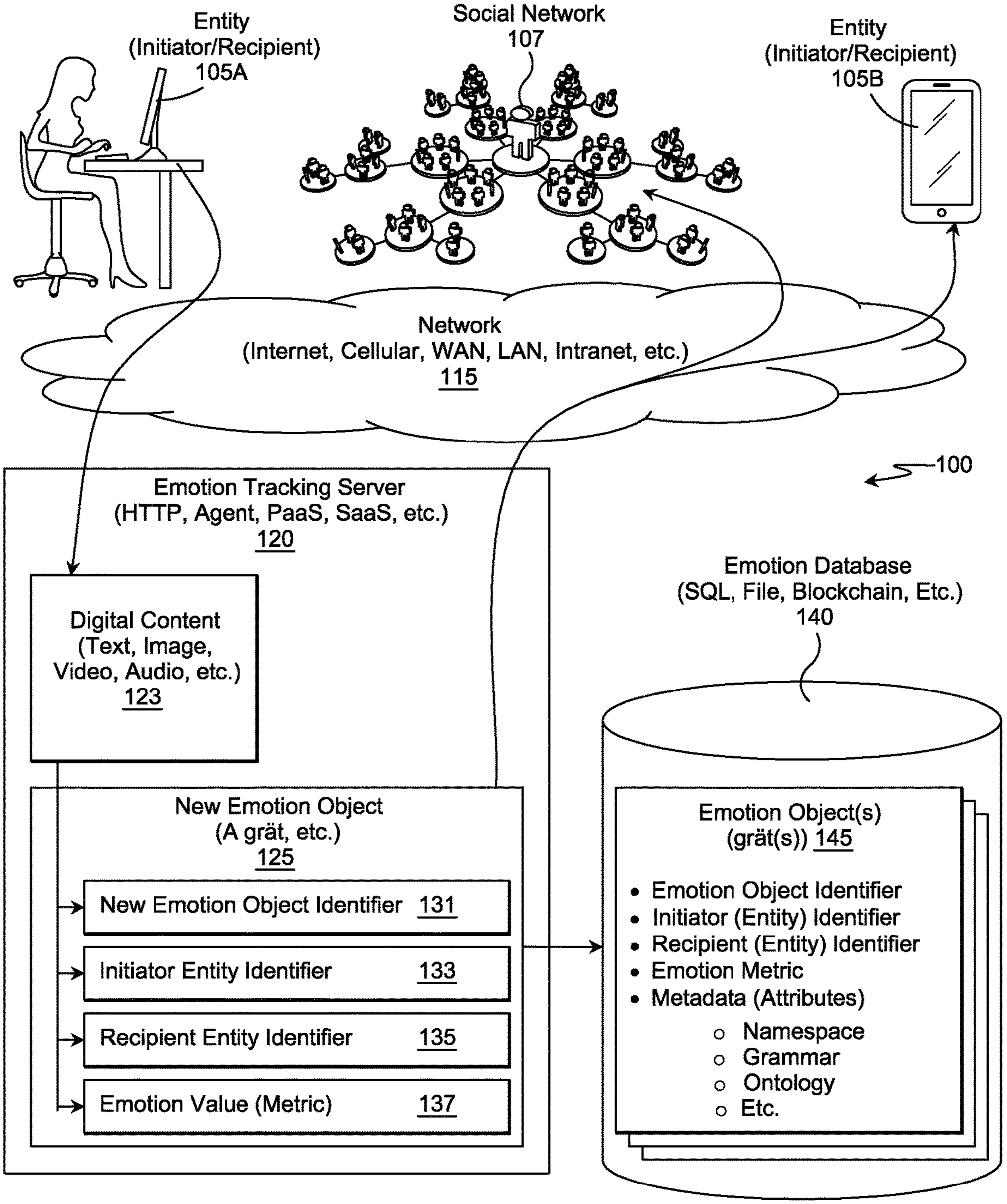
FIG. 1 is an overview of an emotion model tracking system.

It should be noted that any language directed to a computer should be read to include any suitable combination of computing devices, including servers, interfaces, systems, databases, agents, peers, engines, controllers, modules, or other types of computing devices operating individually or collectively. One should appreciate that the computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that cause a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, ad-hoc network, a peer-to-peer network, or other type of packet switched network; a circuit switched network; a cell switched network; or another type of network.

As used in the description herein and throughout the claims that follow, when a system, engine, server, device, module, or other computing element is described as configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

One should appreciate that the disclosed techniques provide many advantageous technical benefits including providing computing systems capable of quickly processing, storing, manipulating, or otherwise efficiently managing digital objects representing emotional relationships. Through leveraging the disclosed technologies, computing devices can quickly identify or model emotional relationships among different entities. Such models or data objects can be considered digital primitives from which additional applications or capabilities can be derived.

The focus of the disclosed inventive subject matter is to enable the construction or configuration of a computing device to operate on vast quantities of digital data beyond the capabilities of a human, where in this case the data represents models for myriad emotional relationships and especially for those emotional relationships concerning gratitude. Although the digital data represents an emotional relationship, it should be appreciated that the digital data is a representation of one or more digital models of the emotional relationship (e.g., an instance of gratitude), not the emotional relationship itself. By instantiating such digital models in the memory of the computing devices, the computing devices are able to manage efficiently the digital data or models in a manner that provides to a user of the computing device utility that the user would lack without such a tool.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if such combinations are not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The following subject matter relates to creating digital data objects representing emotional relationships as emotion objects. Each object can be considered to represent the relationship as defined by at least two entities; an initiator and a recipient. In the disclosed approach, the initiator asserts or otherwise acknowledges that the relationship exists with the recipient. There is no requirement for the recipient to reciprocate or otherwise acknowledge the assertion. In more interesting embodiments, the assertion is based, at least in part, on some item (e.g., previous action, creative work, etc.) associated with the recipient. In view of the expansive nature of the subject matter, the following description presents the subject matter from the perspective of gratitude.

Gratitude as an emotion is of special interest due to its unique nature relative to many other emotions (e.g., love, anger, etc.). Gratitude requires an initial action or existing thing before gratitude can be expressed. For example, before an initiator can assert gratitude toward another entity (e.g., person, place, thing, idea, etc.), that entity must a priori exist in some form (e.g., idea, abstract concept, physical item, tangible item, intangible item, etc.). In more typical cases, a recipient entity takes the initial action that gives rise to the initiator's trigger for asserting gratitude. Thus, gratitude has a quantifiable timeline associated with it and is based on free will actions taken by the recipient and the initiator of the assertion of gratitude.

It should be understood that there is no requirement that the recipient of gratitude be a person. The recipient of gratitude could be an existing thing, a tree or forest for example, or an idea, deity, or other item. Therefore, it is possible that the recipient could be any one of a broad spectrum of items or other inanimate or non-human entities.

FIG. 1 presents an overview of computer-implemented emotion model tracking system 100 that tracks or otherwise manages emotion objects 145 which represent emotional relationships among or between one or more of entity 105A and entity 105B, collectively referred to as entities 105. For clarity, the reader is reminded that emotion objects 145 are digital models for emotional relationships where the emotion objects 145 adhere to an overarching model of one or more emotions. The overarching model can be considered a "firmament" on which applications can be built. For example, a firmament of gratitude can include a defined gratitude ontology, a gratitude namespace, a gratitude grammar, or other formal descriptions that can embodied digitally to represent gratitude.

Emotion tracking system 100 includes emotion database 140 that stores emotion objects 145 and emotion tracking server 120 that processes emotion objects 145 so that they can be accessed via one or more of entities 105 over network 115. For the sake of discussion, in the example shown and from the perspective of gratitude, entity 105A initiates an assertion of gratitude toward entity 105B. Although the following description focuses on a single entity 105A asserting gratitude toward a single entity 105B, it should be appreciated that such assertions can include a one-to-many relationship as well as a many-to-many relationship. Further, given the disclosed techniques, it is possible for entity 105A to assert gratitude toward itself. Thus, in some embodiments, entity 105A and entity 105B could be the same entity.

Emotion database 140 comprises one or more computing devices arranged to operate as a database adhering to a schema, schemata, or other data organization for storing emotion objects 145. Emotion database 140 could include a single computer and storage device executing database application instructions. For example, emotion database 140 could include a server executing an SQL-based relational database application that stores emotion objects 145 on a connected storage sub-system (e.g., HDD, SSD, SAN, NAS, RAID, etc.). Suitable database applications can include Oracle®, PostgreSQL, MySQL, or other types of database applications. Still other types of computing systems are also contemplated for emotion database 140.

Larger systems that can be used to implement emotion database 140 can include server farms, or even cloud-based systems. Cloud-based database applications could also include SQL-based applications executing on Microsoft Azure®, Amazon AWS, or Google Cloud SQL. Still, it should be appreciated that a SQL-based database application is not required. Other options could also include schema-less databases such as NoSQL. Still, the reader should fully appreciate that emotion database 140 stores, in a tangible non-transitory computer readable memory, one or more emotion objects 145 that are indexed for retrieval. In some embodiments, emotion objects 145 adhere to a defined schema while in other embodiments, emotion objects 145 could be considered as independent tuples of data.

As referenced above, emotion objects 145 digitally model an emotional relationship between at least two entities 105. Emotion objects 145 adhere to a one or more emotion classes (see FIGS. 3A and 3B) that include several data members aiding in describing the specific nature of an emotional assertion. In the example shown, entity 105A is asserting gratitude toward entity 105B. Therefore, emotion objects 145 preferably characterize such assertions through several data members including an emotion object identifier, an initiator identifier, a recipient identifier, and at least one emotion metric that quantifies that nature of the asserted emotional relationship.

The emotion object identifier, see new emotion object identifier 131 for an example, is a digital value that identifies a specific instance of one of emotion objects 145. In some embodiments, the emotion object identifier can just be an incremental number. In other embodiments, the emotion object identifier can be a unique emotion object identifier that uniquely distinguishes an instance of emotion object 145 from all other emotion objects 145. Example emotion object identifiers can include a GUID, a UUID, a digital object identifier (DOI), a descriptor derived from digital content, an object identifier (OID), an address, a hash value, or another type of identifier.

The initiator identifier, see initiator entity identifier 133 as an example, represents a value that identifies the initiator of the assertion of the emotional relationship. In the example shown, initiator entity identifier 133 would identify entity 105A. The initiator identifier can take on many different forms including an email address, an address (e.g., cryptocurrency address, URL, etc.), a GUID, a name, a unique alias, or other value that identifies the initiator. It should be appreciated that initiator entity 105A identified by the initiator identifier could include a wide variety of different types of entities. Although FIG. 1 shows that entity 105A is a human at a desktop computer, initiator entity 105A, in principle, could include a person, an animal, an inanimate object, a place, a thing, a corporation, a product, a work of art, a service, an action, a government, an official, a philosophy, a team, a religion, an organization, an event, a topic, a deity, a mythological item, or other type of entity. While the reader might think that initiator entity 105A would only practically include a human, the applicants have appreciated that the initiator entity 105A could include other types of entities as well. For example, a musical artist might write a song about a loved one to assert gratitude toward the loved one. It is true that the artist is asserting gratitude, which would represent a first type of assertion. It is also true that the song itself, its lyrics for example, could be considered as putting forth an assertion. Therefore, the applicants have appreciated that gratitude can be teased apart into many shades or dimensions beyond how gratitude was previously considered in the past.

The recipient identifier, see recipient entity identifier 135 as an example, follows a similar form as the initiator identifier and could be similarly broad in scope. In the example shown, the recipient identifier represents entity 105B where entity 105B could also be a person, an animal, an inanimate object, a place, a thing, a corporation, a product, a work of art, a service, an action, a government, an official, a philosophy, a team, a religion, an organization, an event, a topic, a deity, a mythological item, or another type of entity. In an embodiment associated with one or more of social network 107, entity 105A would likely be a person while recipient entity 105B could be just about anything, a work of art or an album for example. When the assertion is made, the assertion can be published over social network 107 (e.g., Facebook, Instagram, Pinterest, LinkedIn, etc.).

Another point of interest is that the assertion of the emotional relationship can be considered identifiable by the at least the pair of the initiator identifier and the recipient identifier. Such pairs can then be used as a foundation for future analytics or analysis.

The emotion metric, see emotion value 137 for an example, is considered an emotion metric for the asserted emotional relationship. The emotion metric can be associated with at least one of entities 105 individually or collectively. In some embodiments, the emotion metric might be of unitary value; e.g., an integer of one. In more specific cases, the emotion metric is considered a grant of value from the initiator to the recipient. For example, in the case where entity 105A asserts gratitude toward entity 105B, a "grät" of 1 is granted to entity 105B as memorialized in an instantiated version of emotion object 145. It should be appreciated that emotion value 137, as well as the emotion metric, can be single valued (e.g., scalar, text field, etc.) or multi-valued (e.g., vector, matrix, distribution, enumeration, etc.). Additional considerations with regards to emotion metrics are discussed in more detail below.

Emotion metrics can comprise many different types of values including parametric values, non-parametric values, text, statistical distribution information (e.g., average, mean, mode, width), or other types of values. In some embodiments, the emotion metric can adhere to a customized enumeration where a stakeholder defines a preferred ordering of values. Consider a situation where a stakeholder wishes to define a customized enumeration ordering for text values of "high", "medium", and "low". The stakeholder could assign these an order of ["high":1, "medium":2, "low":3] so that high is numerically less than low. Alternatively, the stakeholder could assign a reverse ordering of ["high":3, "medium":2, "low":1] if desired.

Because emotion objects 145 are instances of an emotion class, it is possible the emotion class can include additional data members beyond those discussed above, all of which are contemplated herein. Such additional data members can be leveraged to track or manage emotion objects. Example additional data members include a time stamp, a time span, a location (e.g., room, address, zip code, GPS location, etc.), an entity role type (e.g., manager, employee, etc.), a relationship type (e.g., familial, work, friendship, etc.), or other data members. A very useful data member can include one or more emotion object pointers that point to other emotion objects. Such a pointer can include the emotion object identifier of other emotion objects 145, an address, a URL, or another type of pointer. Use of such a pointer is advantageous because it provides for linking emotion objects 145 together to form chains, possibly including a blockchain or blockchains. Additional pointers can include pointers to content (e.g., assertion compositions, videos, images, sounds, etc.), pointers to web content (e.g., addresses, URLs, DOIs, etc.), or other types of pointers. With respect to gratitude, such chains can be considered a chronicle or ledger of how gratitude is asserted as well as of how gratitude is received, which gives rise to interesting analytical properties. Thus, emotion tracking server 120 can respond to requests for information, including how much gratitude has entity 105A asserted or how much gratitude has entity 105B received and for what reason. Such information represents inputs and outcomes that can be the foundation for training gratitude-based machine learning systems.

Emotion objects 145 can also include one or more portions of metadata attributes that add additional color to the nature of the assertions. The metadata attributes could take on a wide ranging set of information. Still, in more preferred embodiments, the metadata attributes adhere to a formalized definition so that one of emotion objects 145 can be compared to another. In yet more refined embodiments, the metadata attributes adhere to a normalized, language-independent definition. For example, metadata attributes can include name-value pairs where the name is defined by a meaning identifier (e.g., GUID, hash, UUID, integer, etc.)

that corresponds to a normalized meaning while the value represents the specific nature (e.g., text, image, integer value, string, etc.) for the attributes. Consider the example shown from the perspective of gratitude, where entity 105A asserts gratitude toward entity 105B for a past service. The corresponding emotion objects 145 would have attributes that include name-value pairs that describe the nature of the past service in a language-independent fashion. A first attribute might include a name that includes an identifier representing a type of gratitude for "past service" or "nostalgia." Note that use of an identifier allows for mapping such an attribute to any language or culture. The corresponding value for the first attribute would include a specific reference for the past service. The value could include text in the preferred language of entity 105A, say "Help finding a job" in English for example, or could also include a language independent identifier that represents the concept of "job assistance" for example. Again, use of language-independent normalized values, although not specifically required, provides for comparing, contrasting, or analyzing emotion objects 145 no matter their cultural origin.

There are numerous possible types of formal definitions that can be used to define the attribute space or data space for emotion objects 145. Example types for formal definitions to which the emotion metadata attributes adhere include an emotion ontology, an emotion namespace, an emotion grammar, or other system that models the emotional relationships. Each of these types of formalized definitions carry different types of information. In fact, some embodiments use more than one formalized definition where emotion tracking server 120 can be configured to map from one type of definition, say a gratitude ontology, to another type of definition, say a gratitude grammar. The advantage of such an approach is quite important. Each type of representation facilitates different types of transactions or operations. For example, a gratitude grammar can be considered to be action orientated and would thus likely be more useful with binding gratitude-based actions to third parties that focus on action (e.g., care organizations, charities, volunteer organizations, etc.). A gratitude ontology can be considered an overarching description of the nature of gratitude, which can be a representation of the firmament through which analysis or analytics can be performed. A gratitude namespace allows third parties to create custom representations of gratitude that, for example, can be leveraged for application-specific purposes. One application specific example could include creating a customized and possibly enterprise-specific namespace for use in an enterprise setting, perhaps to support human resource management. Still further, each type of formal description or representation for the emotional attribute metadata can adhere to a fee schedule that provides for monetizing the emotional firmament via third parties. The third parties could pay or bid to have their brands associated with emotional assertions represented by the metadata attributes.

Emotion tracking server 120 is one or more computing devices having at least one processor and a tangible, non-transitory computer readable memory storing instructions that configures emotion tracking server 120 to engage with entities 105, social networks 107, or other third parties over network 115. Example computing devices include HTTP servers, cloud-based systems (e.g., PaaS, IaaS, SaaS, Gratitude as a Service, etc.), or other types of devices. In some embodiments, emotion tracking server 120 could include an agent, engine, or module installed on a mobile device (e.g., cell phone, tablet, appliance, vehicle, etc.) that offers the disclosed roles or responsibilities as capabilities for the device. Network 115 can also take on different forms depending on the nature of the deployment of emotion tracking system 100. In more typical embodiments, network 115 includes the Internet. Still other networks can be leveraged to facilitate communications among the various devices including cellular networks, intranets, ad hoc networks, peer-to-peer networks, LANs, WANs, etc.

Emotion tracking server 120 is communicatively coupled with emotion database 140 to facilitate exchange of emotion objects 145. Emotion tracking server 120 and emotion database 140 could be deployed on the same physical device, say an HTTP server that offers access via a web service, or could be separate independent devices. For example, emotion tracking server 120 could be embodied as an app deployed on a cell phone while emotion database 140 could be a remote server accessed over the Internet or cellular networks.

Emotion tracking server 120 executes the stored instructions on its processor(s) to fulfill its roles or responsibilities associated with tracking or otherwise managing emotion objects 145. Emotion tracking server 120 receives digital content 123 from at least a first device where the digital content represents the assertion of the emotional relationship between at least entity 105A and entity 105B. In this example, entity 105A has sent digital content 123 to emotion tracking server 120 over network 115. Digital content 123 can be considered a composition representing the assertion and can therefore include one or more data modalities. Digital content 123 can include text data, image data, video data, motion data (e.g., accelerometer data, locations, etc.), audio data, voice data, music data, promotional data, game data, sensor data, healthcare data, biometric data, medical data, enterprise data, or other types of data. Digital content 123 can be sent using one or more protocols; HTTP, HTTPS, TCP/IP, etc. Further digital content 123 can be serialized or encapsulated within a markup language. For example, an assertion of gratitude, referenced as a "grät" in this document, could be serialized in an XML file having gratitude-based tags defined according to one or more of a gratitude ontology, a gratitude namespace, a gratitude namespace, or another formalized definition of gratitude. Digital content 123 can also include additional information, possibly including the address or identifier of the sending entity or destination entity, time stamps, location information, or other data that can be bound to an instance of an emotion object.

Emotion tracking server 120 attempts to instantiate one or more new emotion objects 125 according to the emotion class from which emotion objects 145 are built. In order to instantiate new emotion object 125, emotion tracking server 120 provisions the newly created object with one or more of the necessary emotion objects that have important values. In the example shown, emotion tracking server 120 obtains new emotion object identifier 131, which could include a GUID, UUID, or other identifier as previously discussed, and represents the initiator identifier for this specific assertion. Such identifiers can be automatically generated. In some cases, new emotion object identifier 131 could be a block identifier within a blockchain, possibly as a hash or address in the Bitcoin blockchain.

Emotion tracking server 120 also derives initiator entity identifier 133 from digital content 123. In more simple implementations, initiator entity identifier 133 could be an email address, a name, a cell phone number, or another identifier of entity 105A. Initiator entity identifier 133 becomes the initiator identifier for the specific assertion represented by new emotion object 125. Similarly, emotion tracking server 120 also derives recipient entity identifier 135 from digital content 123. Recipient entity identifier 135 could be explicitly included by name or reference in digital content 123; e.g., an email address or name of entity 105B. However, it is specifically contemplated that recipient entity identifier 135 can be derived through one or more object recognition techniques including natural language processing, image recognition (e.g., SIFT, DAISY, etc.), audio recognition, or other types of recognition processing. For example, if digital content 123 includes an image of an album cover, the image can be analyzed via computer vision techniques (e.g., OpenCV using SIFT, etc.) to derive one or more descriptors from the image. The descriptors can then be used to search a database configured to return an identifier for the recognized album, assuming the database indexes identifiers based on descriptors. Such a database can be implemented according to search trees and then by leveraging nearest neighbor searches as a function of descriptors. Other types of database searches are also contemplated including, for example and without limitation, use of keyword searches, direct lookups, file system searches. Recipient entity identifier 135 then becomes the recipient identifier for the new emotion object.

The use of the term "derive" with respect to generating identifiers from the digital content is also considered to include generating an identifier de novo. For example, if a recipient is a brand new recipient that has yet to receive gratitude and has not yet been recorded in a database, recipient entity identifier 135 can be generated by emotion tracking server 120 in real-time, possibly through a hash function, via a GUID API, or by another technique.

Figures 3, 3A:
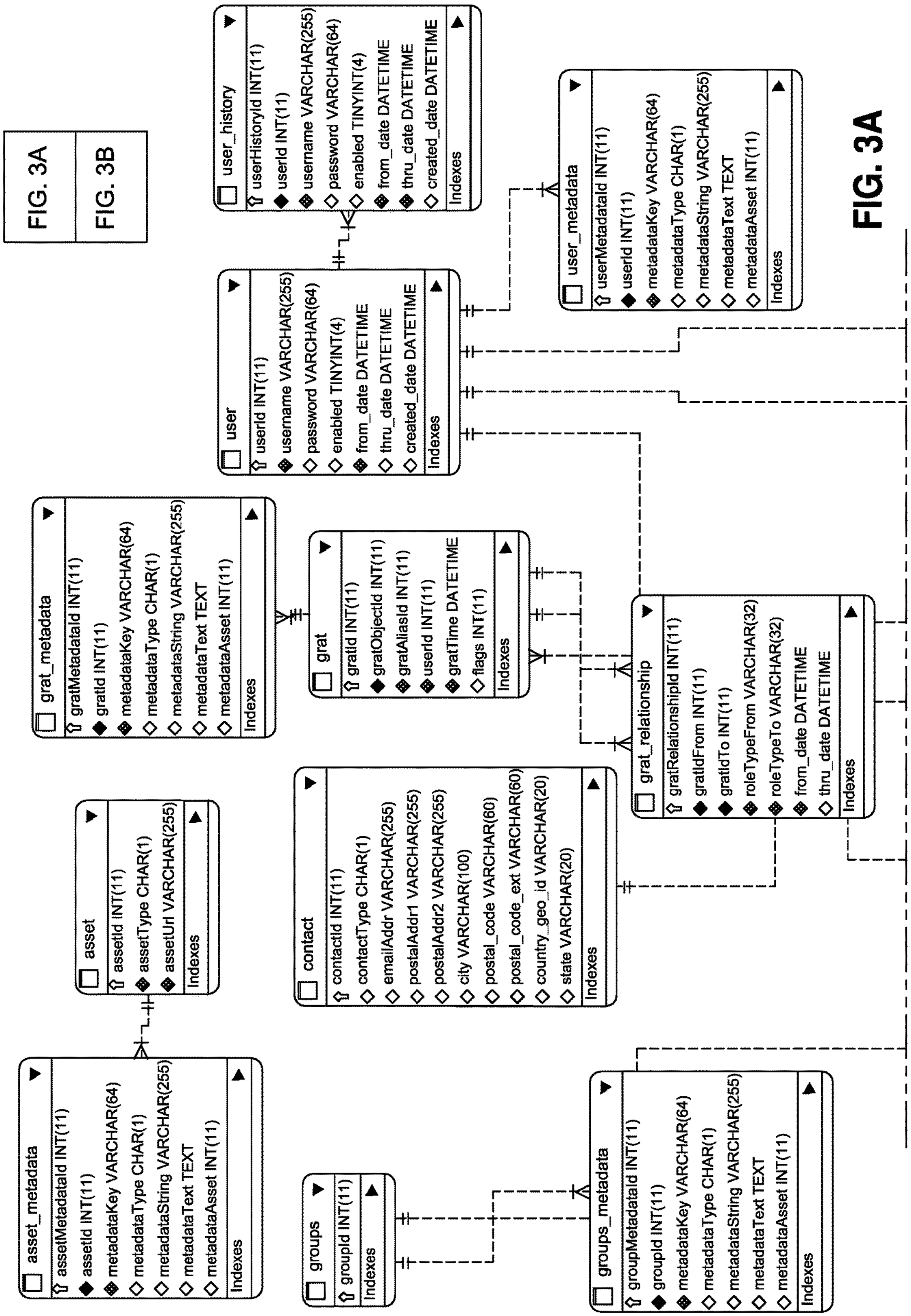
FIG. 3 diagrams FIGS. 3A and 3B.
FIG. 3A and FIG. 3B collectively diagram a data model for storing or managing gratitude objects as an example of managing emotion objects.
Figure 3B:
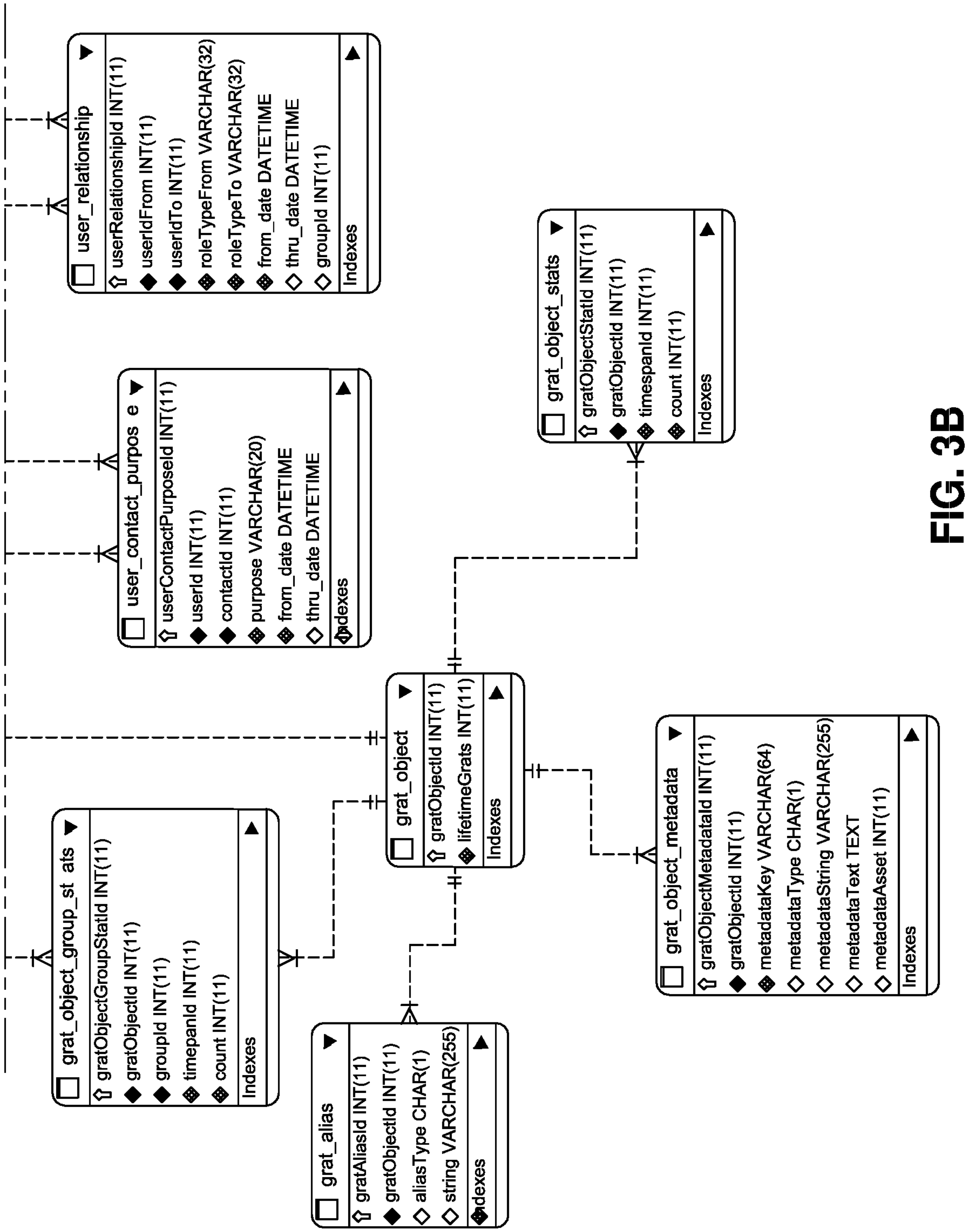

Emotion tracking server 120 instantiates new emotion object 125 according to the emotion class as a function of new emotion object identifier 131, initiator entity identifier 133, and/or recipient entity identifier 135. It should be appreciated that new emotion objects 125 could be instantiated before being provisioned with the data member values or could be instantiated along with the values depending on how the emotion class constructor or methods are called. Although emotion objects 145 are illustrated as a single data structure, it is also possible that emotion objects 145 could be composed of multiple objects or tables linked together as illustrated in FIGS. 3A and 3B.

Emotion tracking server 120 continues to provision new emotion object 125 by assigning an instance emotion value 137 to new emotion object 125. The assignment could happen as part of the instantiation process (i.e., the call to the constructor API) or at a later time. For example, the assignment could occur after an optional validation process that might be present. Instance emotion value 137 becomes the emotion metric of new emotion object 125.

Once instantiated, emotion tracking server 120 stores new emotion object 125 within emotion database 140 as a newly created emotion object 145. Again, it should be noted that new emotion object 125 could be instantiated and stored without being provisioned, but could be provisioned by emotion tracking server 120 at a later time.

Figure 2:
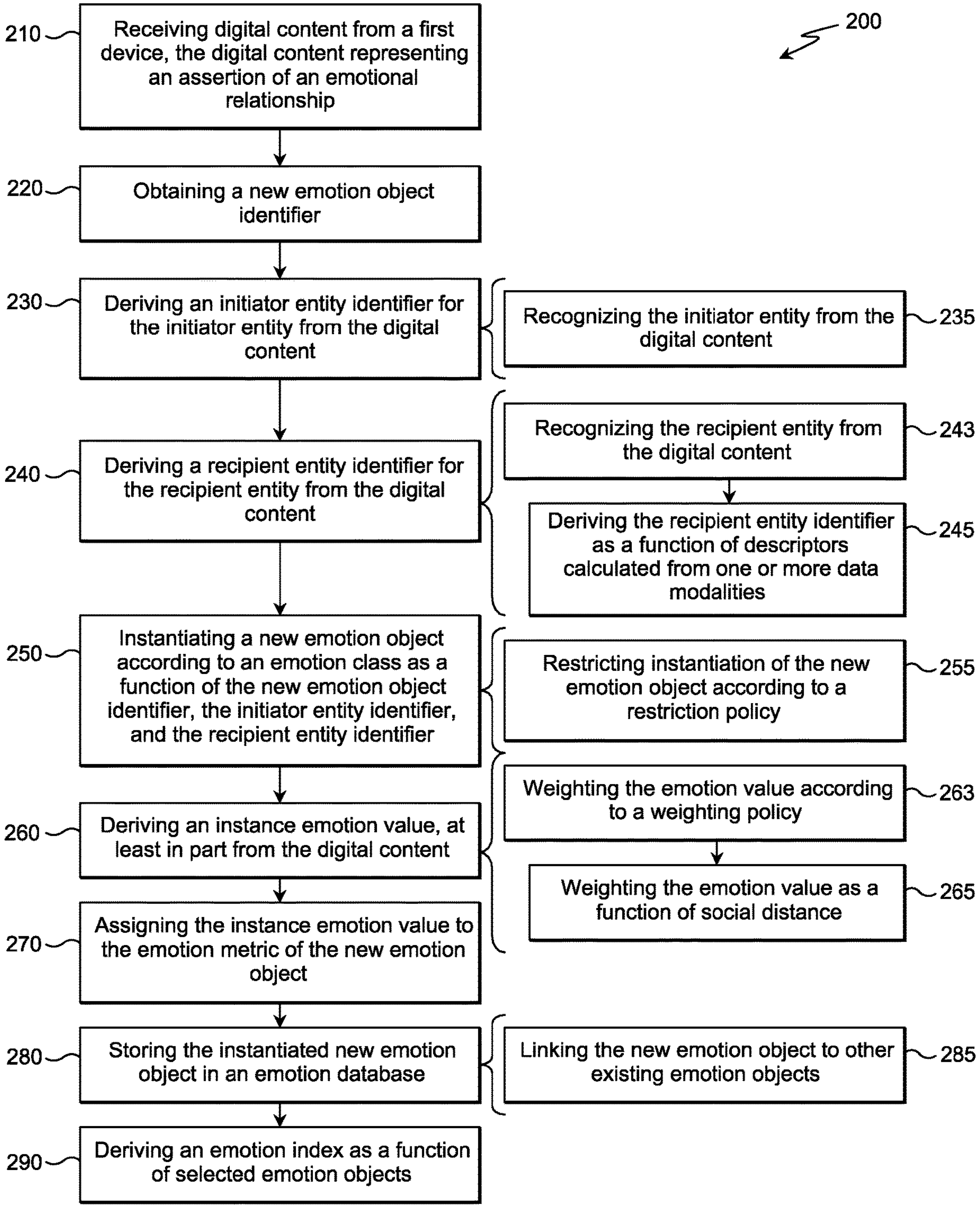
FIG. 2 illustrates as method of tracking or managing emotion objects.

FIG. 2 illustrates the inventive subject matter from the perspective of computer implemented method 200 for managing one or more emotion objects. As with the previous discussion, the following description of method 200 will be presented using gratitude as an example where the emotional relationship models an assertion of gratitude. The computing elements of FIG. 1 are considered suitable for implementing method 200. Although method 200 is presented as a linear sequence, it should be appreciated that the order of execution of the steps can include other, differently ordered practical arrangements.

Starting with step 210, an emotion tracking server receives digital content from at least a first device where the digital content represents an assertion or acknowledgement of an emotional relationship between at least two entities. There are several points of note associated with this step. The sending device can include a mobile device (e.g., cell phone, tablet, gaming system, etc.), an appliance (e.g., a television, etc.), a vehicle (e.g., automobile, etc.), or other computing device provisioned with suitable communication interfaces (e.g., 802.11, Bluetooth®, Ethernet, etc.). In more typical scenarios, a user that participates in the ecosystem likely uses an app deployed on their cell phone to create a composition of content (i.e., the digital content) to represent the assertion of the emotional relationship.

Consider a scenario where a music lover is enjoying listening to "Blackbird" from the Beatles® White Album®. The music lover wishes to assert gratitude for the existence of the White Album, and possibly by extension of the Beatles themselves. For the sake of this example, the focus will be on the album itself. The music lover can engage his gratitude network app on his cell phone to create a composition of gratitude, i.e., a grät. The composition can include multiple modalities of data; perhaps a small audio clip of the song and/or of the music lover saying "Thank you for bringing beauty into my moment," an image of the music lover smiling, and a video clip of other people swaying to the music. The app is configured to permit the music lover to arrange the various modalities of into the composition. The composition is then compiled into digital content, which can be sent to the emotion tracking server. For example, the digital content can be serialized according to one or more formats (e.g., XML, YAML, WSDL, SOAP, etc.) for transmission over a network via one or more protocols (e.g., HTTP, HTTPS, TCP/IP, UDP/IP, etc.). The digital content can include quite a bit of information beyond the composition representing the assertion of gratitude including any, some, or all of the music lover's identifier (e.g., email address, phone number, user identifier in the network, etc.), metadata describing the context in which the grät was triggered (e.g., location, time, proximity to others, ambient data, etc.), possibly an identifier for the recipient of the grät, and other information.

Although the previous example focuses on an exchange between a cell phone and an Internet-based gratitude network server, it should be appreciated that the server functionality could also be deployed local to the user. In some embodiments, the emotion tracking server functionality could be deployed as an agent on the user's cell or as part of an intranet on a closed network.

The application used for the composition of the assertion of gratitude is best constructed to create, as much as possible, a frictionless experience for the user. Thus, the application can provide access to multiple contextually-relevant pieces of content across multiple modalities of data at the user's fingertips. This aspect of the application is considered to be quite valuable because it reduces the barrier to creating an intimate assertion of the emotional relationship. For example, when an emotional trigger or sensation which compels the user to take action is first felt by a user, the application can be configured to present one or more pieces of content (e.g., recently captured sound clips, images, ambient data, etc.) that can be used by the user to create the composition. Further, the application can offer seamless access to the device's sensors (e.g., camera, microphone, biometric sensors, etc.). It is expected that such an approach will allow the user to remain in the moment of intimacy through execution of said user's assertion.

At step 220, the emotion tracking server continues by obtaining a new emotion object identifier. The new emotion object identifier can be obtained from the digital content or it can be locally created. In more preferred embodiments, each assertion and corresponding emotion object passing through the emotion tracking system is given a unique identifier (e.g., GUID, UUID, hash, etc.). The unique identifier can be instantiated through various techniques, possibly based on one or more pieces of data available to the emotion tracking server: location, initiator identifier, recipient identifier, time, date, metadata, or other type of data values. Ensuring that each emotion object has a unique identifier allows stakeholders to analyze or otherwise manage each emotion object individually as well as collectively.

At step 230, the emotion tracking server continues with the effort of creating an emotion object by deriving from the digital content an initiator entity identifier for the initiator entity. As discussed above, the digital content could be provisioned with an initiator's identifier. In some embodiments, the initiator entity identifier can be an address (e.g., email address, address within a blockchain infrastructure, etc.) that preferably uniquely identifies the initiator.

In other embodiments, the emotion tracking server can recognize the initiator entity from the digital content as suggested by step 235. The emotion tracking server can be provisioned with one or more recognition modules capable of converting various modalities of the digital content to one or more descriptors or parameters. The descriptors can then be used as a query to a database of indexed initiator identifiers. Consider cases where the digital content includes a voice of the initiator and/or an image of the initiator. The recognition module could employ ALIZE (see URL mistral.univavignon.fr/mediawiki/index.php/Main_Page) to convert the digital content into biometrics that can then be used to identify the initiator. Alternatively, the recognition module could use OpenCV to convert image data into descriptors, which can then be used to look up the identity of the initiator.

In a similar vein, at step 240, the emotion tracking server derives or otherwise generates from the digital content a recipient entity identifier for the recipient entity. The reader should keep in mind that the nature of the recipient could be quite varied and could include a person, a thing, a place, a religion, an action, an idea, a mythological item, a deity, or another type of item. Similar to the initiator entity identifier, the recipient entity identifier is also preferably unique. Still, due to the possible varied nature of the recipient, the recipient entity identifier can be constructed to carry additional information to better describe the nature of the recipient. Returning to the example of a grät granted to the Beatles' White Album, the corresponding recipient identifier might include a field representing the White Album and a field representing the Beatles. Thus, the resulting recipient entity identifier could be multi-valued where the fields correspond to a named-hierarchy or taxonomy. In simpler embodiments, the recipient entity identifier can also be a GUID, UUID, or other unique identifier. In some embodiments, the recipient entity identifier value and the initiator entity identifier value are assigned according to a well-defined address space; a hash space, network address space, or other address space for example. Assigning identifiers from a common address space provides the advantage of transmitting or routing assertions, or other emotional relationship information, from one entity to another. Naturally, it should be appreciated that it is possible within this disclosed framework for a recipient entity identifier to also serve as an initiator entity identifier when the circumstances permit; e.g., a recipient entity asserting gratitude toward another entity.

Further in view of the varied nature of the recipient entity and considering that the digital content likely carries data about the recipient entity in some form, the emotion tracking server can distinguish the recipient entity from the digital content via the aforementioned recognition module as suggested by step 243. Focusing on just image data, for example, the emotion tracking server can derive the recipient entity identifier as a function of descriptors calculated from the one or more data modalities of the digital content (step 245). As a more specific example and based on embodiments that leverage computer vision techniques, consider a case where the digital content includes an image of an actress or other type of artist. The recognition module can calculate one or more descriptors from the image using recognition algorithms; e.g., SIFT, FAST, TILT, DoG, edges. The recognition module can submit the descriptors to an object database of known objects where the object database could use a nearest neighbor search, or other suitable lookup technique, to return objects having descriptors that are similar and where the known objects are indexed according to previously calculated descriptors. The retuned result sets can include information about the recognized objects (e.g., artist, actress, etc.), preferably including the recipient entity identifier for the actress or artist.

There will be circumstances where no a priori recipient identifier exists for the recipient entity. In such cases, the emotion tracking server can generate a brand new recipient entity identifier to represent the recipient entity. The new recipient entity identifier can be created to adhere to the common address space, if such a space is used, as a function of the information or data available in the digital content. Consider an example where a college student is the first person to assert gratitude or send a grät to a new "garage band." The college student takes an image of a poster advertising a recent gig and sends the image of the poster through the grät network to a gratitude tracking server (i.e., an emotion tracking server focused on gratitude). The gratitude server analyzes the image of the poster via implementations one or more recognition algorithms and finds no match, at least no match to within threshold or matching criteria. Finding no match, the gratitude server can generate a new recipient entity identifier for the band, possibly provisioning a corresponding recipient entity object with data from the image (e.g., a band name, a location, a play list, etc.). The gratitude server can then submit the image of the poster, or the provisioned recipient entity objects, along with the newly created recipient entity identifier, to the known object database for future use.

The gratitude server could also return more than one possible recipient entity identifier that satisfies search criteria or other match criteria. In such circumstances, the gratitude server can rank the recipient identifiers in the result set according to one or more metrics (e.g., proximity to user, time, user preferences, etc.) and provide back to the initiator the ranked listing of possible recipients. The initiator can then select which recipient or recipients are the preferred target or targets of the grät.

At step 250, once sufficient data is available, the emotion tracking server instantiates a new emotion object according to an emotion class as a function of the new emotion object identifier, the initiator entity identifier, and the recipient entity identifier. As discussed previously, the emotion class represents a computer definition of a data structure to model emotional relationships. One possible framework for an emotion class is presented in FIGS. 3A and 3B, which focuses on gratitude. It should be appreciated that the new emotion object could be instantiated with NULL fields that are then provisioned via one or more called methods of the emotion class. Thus, there is no requirement that a call to a constructor include the data values for the identifiers. Alternately, the digital content or portions thereof could be passed to the constructor of the emotion class, which in turns derives or otherwise obtains the identifiers.

It is also specifically contemplated that instantiation of the new emotion object could be restricted. The reason for such restrictions is to prevent users from "gaming the system" in embodiments where users try to gain value arising out of their assertions of emotional relationships. For example, in embodiments where a gratitude value is bound to an assertion of gratitude and where the gratitude value, or grät, is given to the recipient, the recipient could continuously grant gräts to itself, thus artificially inflating its own prestige. Step 255 references the emotion tracking server restricting of the new emotion object according to a restriction policy.

Restriction policies aid in preventing users from leveraging the system toward their own benefit rather than for the benefit to others. As alluded to above, in embodiments where emotion objects, say gräts for example, carry value, restriction polices to prevent undue inflation aid in throttling the creation or the disposition of value. The restriction policies can operate as a function of a wide variety of attributes or other metadata including a time, a time period, the identifier of the initiator entity or recipient entity, a location, or other metadata values. An especially useful restriction policy restricts or prevents instantiation as a function of both the initiator entity identifier and the recipient entity identifier. For example, when the emotion tracking server identifies that the initiator of a gratitude assertion is attempting to make multiple assertions toward the same recipient in a short time period (e.g., within a minute, an hour, a day, a week, etc.), the gratitude tracking server can prevent duplicative subsequence assertions. Further, the restriction policy can be configured to restrict insanitation of the new emotional objects when the initiator entity identifier is somehow linked to the recipient entity identifier. A few examples could include both identifiers being the same (i.e., restrict assertions of gratitude toward oneself), the identifiers representing a familial connection, the recipient identifier indicating the recipient entity is a creative work of the initiator entity, and another type of link or association among the entities.

In more interesting embodiments, at step 260, the emotion tracking server also derives an instance emotion value at least in part from the digital content. As discussed previously, the instance emotion value represents a perceived value of the assertion; a value of an assertion of gratitude for example. In some scenarios, the instant emotion value could be set to an integer value; "1," for example, possibly according to the restriction policy. Still, it is specifically contemplated that the derivation of the instant emotion value can be more complex. For example, if the assertion is first detected by the emotion tracking server, the corresponding instance emotion value could be set to a higher value than on subsequent assertions for similar subject matter. Further, the derived instance emotion value could be derived based on a complexity of the composition representing the assertion. Perhaps an audio track or play list within the digital content represents a significant amount of work on the part of the initiator. The amount of work associated with the digital content can be quantized (e.g., amount of data, number of data modalities used, reported time spent composing the digital content, originality of the work, etc.) by the emotion tracking server, and this quantization can then be converted to an instance emotion value.

An especially interesting scenario for deriving the instant emotion value can be found in the case of distributed social networks. Consider an example where a person wishes to assert gratitude for a sports team. The person might compose a grät asserting gratitude for a recent win. The instant gratitude value could be set to "1" so that the team receives one unit of gratitude. The grät can then be publicized or published through the person's social network, allowing others to piggyback on the grät by asserting their own gratitude. Each subsequent grät can result in their instance emotion value being weighted according to the weight policy (step 263) in view that they were not the true initiator of the first assertion of gratitude. For example, the emotion tracking server can weight the instant emotion value as a function of social distance between the initiator entity and subsequent initiators. More specifically, a subsequent initiator might have three degrees of separation from the original initiator and see the original grät via Facebook®. The subsequent initiator piggybacks on the assertion by "regräting." The instance gratitude value of the subsequent initiator can be down-weighted, say by the reciprocal of the social distance (⅓), according to the weighting policy. To ensure that a total value does not over-inflate, the weight could, in one exemplary embodiment, be of the form $w=b/2^d$, where "w" is the weighted value, "b" is the base value, and "d" is the social distance measured in degrees of separation.

Once the instance emotion value is derived, at step 270, the emotion tracking server assigns the instance emotion value to the net emotion object's emotion metric, thereby memorializing a value associated with the assertion of the emotional relationship. It should be appreciated that the assignment could occur through the call to a constructor method or could occur via downstream APIs. In more preferred deployments, the assigned emotion metric will likely remain a static value that can be later retrieved and analyzed as a historical data primitive. However, it is also contemplated that the emotion metric could be dynamic where it changes with time as new information regarding the assertions becomes available. Such an approach gives rise to the ability to generate retrospective gräts once suitable conditions are observed.

At step 280, the emotion tracking server stores the instantiated new emotion object in an emotion database. Storing the new emotion object can include making appropriate API calls, SQL for example, to the emotion database. In other simple embodiments, the new emotion object can be serialized in a mark-up language or stored in a file where the file system operates as the emotion object database. In more interesting embodiments, the emotion database could include a distributed ledger; e.g., a blockchain. In such embodiments, emotion objects within the emotion database can be linked to one another (e.g., the new emotion object is linked to other existing emotion objects at step 185) to form one or more blockchains. An emotion blockchain could be global, personalized, entity-specific, or even external to the disclosed ecosystem. For example, the new emotion objects could be stored into an existing cryptocurrency blockchain (e.g., Bitcoin, Peercoin, Dogecoin, Litecoin, etc.). The advantage to such an approach is that the blockchain forms a verifiable ledger of cross-linked assertions, thereby giving credence to, and verifiable evidence for, any data derived from the emotion objects.

Each entity could have one or more individual blockchains. Considering that each entity could be an initiator or a recipient, it is possible that an entity could have an initiator blockchain having all the emotion objects that the entity initiated thereby creating a ledger of its gratitude. The initiator blockchain can be constructed to have only emotion objects having a common initiator identifier. Further, the same entity could also have a recipient blockchain having all emotion objects that it has received. Such a recipient-focused blockchain would only have emotion objects having a common recipient identifier. It is also possible that each entity just has a single blockchain covering both sides of the initiator-recipient coin. It is also contemplated that the disclosed gratitude blockchains could become the foundation for a gratitude-based cryptocurrency.

As the emotion database becomes populated with emotion objects and their associated emotion metrics, new opportunities present themselves to the various stakeholders of the disclosed ecosystem. The emotion objects can be analyzed or studied to gain insight into the nature of the specific nature of the assertions. For example, the emotion tracking server can derive an emotion index as a function of one or more selected emotion objects as suggested by step 290. Within the context of gratitude, a gratitude tracking server could derive a gratitude ticker representing how much gratitude has flowed through the system per unit time (e.g., per minute, per hour, per day, per year, since inception, etc.) by summing all the gratitude metrics from gratitude objects. Thus, the gratitude index, or other emotion index, can be derived by using a cumulative function of emotion metrics of selected emotion objects. Two simple examples can include deriving the emotion index from emotion metrics having a common initiator identifier (i.e., how grateful is the initiator) or from emotion metrics having a common recipient identifier (i.e., how much gratitude is received).

Deriving an emotion index, especially with respect to time, is considered advantageous because it allows stakeholders to observe trends, rates of change, higher order derivatives (e.g., $d^2g/dt^2$, $d^3g/dt^3$, $d^4g/dt^4$, etc.), or other types of metrics. It should be appreciated that the contemplated emotion indices, the gratitude index for example, can change with time. In such cases, the emotion tracking server can update the presentation of a defined emotion index as time passes, perhaps on a real-time basis similar to a stock ticker.

Beyond using time as a foundation for tracking a gratitude index, other factors can also be used. Consider location, for example. A gratitude tracking server can be queried to obtain a results set of gratitude objects associated with a specific location; e.g., a zip code, a building, a geo-fenced area, a monument, or another location. The gratitude tracking server can present the gratitude index of the location as a function of the emotion metrics of all the gratitude objects in the corresponding results set.

Time and location are just two dimensions by which emotion objects could be selected. Considering that the each emotion object can be provisioned with metadata, the number of relevant dimensions by which emotion objects can be selected for analysis can be quite high. Thus, the emotion index can be derived as a function of emotion objects associated with a broad spectrum of selection criteria. For example, the selection criteria could depend on metadata including a type of emotion, a category, a classification, an emotion field, a time, a location, a building, a profession, a product, a good, a service, a user defined field, or another dimension. The contemplated field has measured values (e.g., time, location, etc.) as well as derived values (e.g., headings, trends, etc.). Returning to the example of gratitude, the Applicants have coined the term "grät field" to mean a gratitude index that can be derived based on a one or more desired dimensions of relevance. The grät field becomes a valuable resource to third parties because third parties can bind their actions, brands, goods, or services to the nature of the gratitude, possibly in exchange for a fee. Thus, the inventive subject matter is considered to include monetizing the grät field through fee schedules, auctions, or other financial instruments or mechanisms.

Although it is possible to generate negative emotion metrics, the Applicants assert that the use of positive emotion metrics can nudge users toward positive behaviors or experiences. Thus, using positive emotion metrics generates emotion indices that are monotonically increasing. From a gratitude perspective, permitting only positive gratitude values is considered useful for reducing negative impacts on the user base. As can be appreciated, if other outcomes are desired, or reducing negative impacts on the user base is not a concern, the inventive subject matter of the present application contemplates that emotions other than gratitude can be utilized.

FIGS. 3A and 3B collectively present an overview of a possible data structure schema for gratitude objects and an example of how the inventive subject matter associated with emotion objects can be implemented. The example of FIGS. 3A and 3B was developed using SQL and will be readily understood by those skilled in the use of SQL. It should be appreciated that the example in FIGS. 3A and 3B is presented for illustrative purposes and should not be considered limiting. For example, FIGS. 3A and 3B provides a representation that is recipient-focused as represented by the grat_object structure. Alternative representations might be initiator foci, or a gratitude assertion focus (see the grat structure). It is appreciated by the Applicants that the emotion object data structure or table definitions can take on additional characteristics beyond those shown.

The example gratitude classes or tables comprise numerous features consistent with the previous discussion about emotion classes and give rise to the capabilities of an emotion tracking server as discussed above. The grat_object represents the high level data construct representing one or more assertions of gratitude toward a recipient entity. Of particular interest, the grat_object includes gratObjectid, which can be considered the recipient identifier discussed previously. In this example, the gratObjectid is represented by an integer having 11 digits. However, it is possible for the gratObjectid, as with other members of the data structures, to have alternative representations; e.g., 128, 256, or more bits to ensure a sufficient address space to support massive numbers of grat object. Note that the grat structure is the high level representation of the assertion of gratitude.

In the presented example, emotion metrics within grat_objects are represented through several fields. For example, the lifetimeGrats field can be considered a grät index that aggregates the value of all associated assertions of gratitude toward the person. Further, grat_object_stats also carries a gratitude version of an emotion metric in the field count.

Entity information is represented by the several of the structures, including contact, grat_relationship, and the "user" structures. For example, the initiator entity identifier is the gratidFrom field in grat_relationship and the recipient entity identifier is the gratidTo field in the same structure. Note that the contact structure carries information about the specific entity; e.g., email address, postal address, or other information.

There are several other points of interest within the schema outlined in FIGS. 3A and 3B. Note that the grat_object can be represented by grat_alias. The grat_alias structure includes several fields, including aliasType and string. These fields allow the identification of a grat_object in any language. For example, one grat_object could include multiple aliases, perhaps in English using ASCII and/or Japanese in Unicode. This approach is considered advantageous because it provides for support across languages and for a normalized representation of the underlying objects; e.g., the grat_object.

Another point of interest is represented by the various metadata structures, including grat_object_metadata, user_metadata, grat_metadata, groups_metadata, and asset_metadata. These structures are specifically constructed to support multiple models for representing metadata, including namespaces, ontologies, grammars, tuples, or other formalized representations of a gratitude data space. For example, the metadataKey can be an identifier of attribute types in an attribute space. As represented, the metadataKey can represent up to 64 bytes worth of identifiers, a vast space. Further, the metadataString could be used to represent the value of a specific attribute. This approach to metadata allows for objects in the system to accrue nearly any type of metadata including global metadata, jurisdictional metadata, cultural metadata, language metadata, statistics, or other types of metadata. The asset structure supports pointing to external information possibly including files, images, URLs, APIs, or other external objects.

Yet another point of interest is the use of the group structures. The group structures represent groups of entities rather than a single entity. Example groups might include friends, workmates, organizations, categories, user-defined collections, or other types of groups.

Again, FIGS. 3A and 3B present one possible implementation of a structure for the creation of gratitude-focused assertions of emotional relationships. It is appreciated by the Applicants that the specific representation of FIGS. 3A and 3B would not necessarily be used to characterize other types of emotions. Consider happiness, for example. Happiness could be initiated without an a priori action by another or without a precursor. Thus, the concept of recipient entity does not necessarily make sense for happiness. On the other hand, gratitude requires that something that triggers or evokes gratitude within the initiator exist a priori and that the gratitude be directed to a recipient. Further, the disclosed approach facilitates the positive experience associated with gratitude while other emotions can carry a negative experience; e.g., unrequited love.

There are numerous additional considerations associated with the inventive subject matter. The disclosed approach provides a firmament for big data analytics. As assertions of gratitude are created, the context under which the assertions are made (e.g., sounds, images, locations, etc.) is captured within the metadata. Thus, each assertion event can be characterized and analyzed individually or collectively. The grät object becomes a data primitive that populates the gratitude data space. Stakeholders can then engage with the data space to determine how gratitude flows and attempt to bind their messages or consumer engagement points based on the gratitude flow.

Given the disclosed infrastructure, it is possible for the assertion of gräts to be handled on a many-to-many basis. A group of initiators could band together to operate collectively as an initiator entity. When the initiation criteria are achieved (e.g., number of participants, timing, etc.), the grät can be sent automatically to the target recipient entity or entities. Additionally, the recipient entity could also include multiple recipients. When the initiator entity submits a grät to many recipients, the server can create individual grät objects automatically and send the corresponding gräts to each individual recipient.

Numerous opportunities arise in view that the act of asserting gratitude can be quantized or characterized via the metadata. As an example, consider the trigger point for assertion of gratitude where a person composes an assertion on their cell phone. The person, through interactions within their environment, experiences some form of trigger likely evoked from some object in the environment; e.g., a sound, an image, a video, a remembrance, etc. The person engages with an app on their cell phone to convert the evoked feeling into the assertion of gratitude. At this point, the app can capture data about the user's context (e.g., location, time, ambient sounds, etc.), which can be packaged as metadata for the assertion. Further, the app can query the user to obtain further clarity about why, or for what reasons, the assertion is being generated or to resolve ambiguities on target recipients. This can also be captured as part of the metadata. Assume for the sake of discussion that the trigger was a feeling of nostalgia with respect to an image. The metadata could include an attribute of the form <trigger: :nostalgia> and recognized features or objects in the image could also be tagged with this attribute-value pair. This attribute in the metadata could then be useful for other third parties; a brand manager for a company could pay, perhaps for exclusivity, to have their advertising message presented for all assertions based on nostalgia. This small example illustrates how the grät field can be characterized and quantified for new, novel uses.

A more interesting example of quantifying a gratitude data space includes instantiating new recipient entities representing abstractions that are less tangible or that lack an "owning" entity. Consider a scenario where an individual wishes to express gratitude toward the sky. The disclosed techniques provide for instantiating a "sky" recipient in a language-independent, normalized fashion. The newly instantiated sky recipient can be constructed to collect expressions of gratitude (i.e "gräts") from others who assert gratitude toward the sky. Thus, such abstractions are expected to grow in value and would likely become of great interest to third parties as gräts flow to the abstractions. Third parties can attach their brands or message to gräts that target such entities. Additional possible abstractions can include philosophies, deities, vegetation, organisms (e.g., genus, species, etc.), or other types of entities that would lack an owner.

In addition to quantizing assertions of gratitude, the aggregation of information across multiple assertions also creates analytic, social anthropological, novel means of determining the perceived meaning of brands, monetization and other opportunities. Just a few examples include creating a year in review where initiators can see how gracious they have been over the year, recipients can see how much gratitude they have received, or other type of review. Still further, the system could create a grät potential, a precursor for the grät field, where users indicate opportunities for others to take action that would be worthy of an assertion of gratitude. For example, users could indicate geo-locations in the city that require litter pick-up. Such information can be compiled to create a geo-based grät potential field. Others can see potential "hot spots" and take appropriate action. In response to the action, they could receive assertions of gratitude from others or they could receive stored gratitude that is granted upon completion of action. Such an approach lays the foundation for gamification of gratitude to nudge people toward positive behaviors or experiences.

Gräts can be constructed to operate on numerous fronts according to programmatic instructions. A grät object can include data members, including instructions that define how the object should behave over time. Examples include generating continuous gräts that operate as a function of time (e.g., absolute time, periodic time, relative time, irregular or stochastic time, etc.), generating retrospective gräts based on detected past patterns in observed metrics (e.g., emotion metrics, grät data space dimensions of relevance, etc.), or generating new gräts based on triggering conditions (e.g., detected trends, observed leading indicators, etc.) just to name a few.

A grät object or series of grät objects could be used to certify or notarize a social media posting. For example, the system can assemble a blockchain of grät objects. The blockchain of grät objects can include private data along with public data. Upon a particular authorization or payment, the private data in blockchain of grät objects could be accessed. The entire blockchain of grät objects could have a hash value for all of the data within the block chain, and the private data would only be visible as a hash value, and private data validated by authorized access upon the chain becoming visible. Third party social media systems and websites (e.g. FaceBook®, Amazon® Reviews) could access the blockchain of grät objects via API or widget. As a person creates a social media post, the widget or API could obtain a time-stamp and hash from the current block in the blockchain of grät objects. The widget or API would then create a hash specific for social media posts based on the time-stamp, the hash of the blockchain of grät objects, and the content of the social media post. The forgoing data structures have the advantage of verifying or "notarizing" a social media post via a blockchain of grät objects. Furthermore, the social media post could be considered validated to be used for data analysis.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A computer-based digital object tracking system comprising:

at least one non-transitory computer readable memory storing software instructions, the at least one memory further storing at least one tracking ticker having a cumulative value and at least one entity-specific blockchain data structure forming a verifiable ledger of linked digital objects associated with a specific person; and at least one processor coupled with the at least one memory, the at least one processor being operable to perform, upon execution of the software instructions, operations comprising:

receiving digital content from a first device;

deriving a set of attributes from the digital content including at least one tracking metric;

instantiating a new digital object in the at least one memory according to the set of attributes;

linking the new digital object to an existing associated object within the at least one entity-specific blockchain data structure thereby forming a verifiable chain of digital objects associated with the specific person, said linking comprising storing, in the new digital object, a pointer to the existing associated object so that the new digital object and the existing associated object form a chain within the entity-specific blockchain data structure;

identifying the at least one tracking ticker via selection criteria based on the set of attributes;

updating the cumulative value of the at least one tracking ticker according to a cumulative function by summing the at least one tracking metric with the cumulative value;

causing a second device to present the updated cumulative value of the at least one tracking ticker; and providing access to the new digital object via the at least one blockchain data structure;

wherein the updated cumulative value comprises a rate of change of the at least one tracking ticker;

wherein the set of attributes comprises a set of name-value pairs;

wherein the at least one tracking metric comprises a weighted value derived from the set of attributes of the new digital object.

2. The system of claim 1, further comprising an object database storing the new digital object.

3. The system of claim 2, wherein the operations further include providing access to the new digital object via the object database.

4. The system of claim 3, wherein the new digital object comprises an emotion object.

5. The system of claim 1, wherein the new digital object comprises an emotion object.

6. The system of claim 5, wherein the emotion object comprises a gratitude-based assertion.

7. The system of claim 1, wherein the at least one entity-specific blockchain comprises a distributed ledger.

8. The system of claim 1, wherein the at least one entity-specific blockchain comprises a global blockchain.

9. The system of claim 1, wherein the at least one entity-specific blockchain comprises, at least in part, a cryptocurrency blockchain.

10. The system of claim 1, wherein the new digital object comprises a private object accessible according to a fee schedule.

11. The system of claim 1, wherein the access is provided via at least one application programming interface (API).

12. The system of claim 11, wherein the access via the API is over a network.

13. The system of claim 1, wherein the access is provided via a social media widget.

14. The system of claim 1, wherein the updated cumulative value comprises a higher order derivative than the rate of change of the at least one tracking ticker.

15. The system of claim 1, wherein the name-value pairs adhere to a defined namespace.

16. The system of claim 15, wherein the defined namespace comprises an entity-specific namespace.

17. The system of claim 1, wherein the set of attributes include at least one of the following types of attributes: a location and a time.

18. A computer-based digital object tracking system comprising:

at least one non-transitory computer readable memory storing software instructions, the at least one memory further storing at least one tracking ticker having a cumulative value and at least one entity-specific blockchain data structure forming a verifiable ledger of linked digital objects associated with a specific person; and at least one processor coupled with the at least one memory, the at least one processor being operable to perform, upon execution of the software instructions, operations comprising:

receiving digital content from a first device;

deriving a set of attributes from the digital content including at least one tracking metric;

instantiating a new digital object in the at least one memory according to the set of attributes;

linking the new digital object to an existing associated object within the at least one entity-specific blockchain data structure thereby forming a verifiable chain of digital objects associated with the specific person, said linking comprising storing, in the new digital object, a pointer to the existing associated object so that the new digital object and the existing associated object form a chain within the entity-specific blockchain data structure;

identifying the at least one tracking ticker via selection criteria based on the set of attributes;

updating the cumulative value of the at least one tracking ticker according to a cumulative function by summing the at least one tracking metric with the cumulative value;

causing a second device to present the updated cumulative value of the at least one tracking ticker; and providing access to the new digital object via the at least one blockchain data structure;

wherein the updated cumulative value comprises a rate of change of the at least one tracking ticker;

wherein the updated cumulative value comprises a higher order derivative than the rate of change of the at least one tracking ticker;

wherein the at least one tracking metric comprises a weighted value derived from the set of attributes of the new digital object.

19. A computer-based digital object tracking system comprising:

at least one non-transitory computer readable memory storing software instructions, the at least one memory further storing at least one tracking ticker having a cumulative value and at least one entity-specific blockchain data structure forming a verifiable ledger of linked digital objects associated with a specific person; and at least one processor coupled with the at least one memory, the at least one processor being operable to perform, upon execution of the software instructions, operations comprising:

receiving digital content from a first device;

deriving a set of attributes from the digital content including at least one tracking metric;

instantiating a new digital object in the at least one memory according to the set of attributes;

linking the new digital object to an existing associated object within the at least one entity-specific blockchain data structure thereby forming a verifiable chain of digital objects associated with the specific person, said linking comprising storing, in the new digital object, a pointer to the existing associated object so that the new digital object and the existing associated object form a chain within the entity-specific blockchain data structure;

identifying the at least one tracking ticker via selection criteria based on the set of attributes;

updating the cumulative value of the at least one tracking ticker according to a cumulative function by summing the at least one tracking metric with the cumulative value;

causing a second device to present the updated cumulative value of the at least one tracking ticker; and providing access to the new digital object via the at least one blockchain data structure;

wherein the updated cumulative value comprises a derivative associated with a rate of change of the at least one tracking ticker;

wherein the at least one tracking metric comprises a weighted value derived from the set of attributes of the new digital object.

* * * * *